United States Patent
Bentele-Calvoer et al.

(10) Patent No.: US 10,452,742 B2
(45) Date of Patent: Oct. 22, 2019

(54) METHOD AND DEVICE FOR RECOGNIZING A DEVIATION OF A YAW-RATE SIGNAL OF A YAW-RATE SENSOR

(75) Inventors: Stephan Bentele-Calvoer, Leonberg-Warmbronn (DE); Norman Schuetze, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 13/583,567

(22) PCT Filed: Jan. 28, 2011

(86) PCT No.: PCT/EP2011/051229
§ 371 (c)(1),
(2), (4) Date: Nov. 20, 2012

(87) PCT Pub. No.: WO2011/110382
PCT Pub. Date: Sep. 15, 2011

(65) Prior Publication Data
US 2013/0103252 A1 Apr. 25, 2013

(30) Foreign Application Priority Data

Mar. 9, 2010 (DE) .................. 10 2010 002 680

(51) Int. Cl.
*G01P 3/44* (2006.01)
*G01C 25/00* (2006.01)
(Continued)

(52) U.S. Cl.
CPC ............. *G06F 17/00* (2013.01); *G01C 21/26* (2013.01); *G01C 25/005* (2013.01);
(Continued)

(58) Field of Classification Search
CPC .. G06F 7/70; G06F 7/00; G06F 19/00; G05D 1/00
(Continued)

(56) References Cited

U.S. PATENT DOCUMENTS 5,579,230 A * 11/1996 Lin et al. ................... 701/70
6,122,577 A * 9/2000 Mergenthaler et al. ..... 701/30.2
(Continued)

FOREIGN PATENT DOCUMENTS

CN 1160851 A 10/1997
CN 1902070 1/2007
(Continued)

OTHER PUBLICATIONS

International Search Report, PCT International Application No. PCT/EP2011/051229, dated Apr. 28, 2011.

*Primary Examiner* — Charles J Han
(74) *Attorney, Agent, or Firm* — Norton Rose Fulbright US LLP; Gerard Messina (57) ABSTRACT

A method for recognizing a deviation of a yaw-rate signal of a sensor of a vehicle is proposed which includes a step of receiving a piece of information regarding a linear acceleration of the vehicle, and a step of receiving the yaw-rate signal, which represents a yaw rate of the vehicle. A step of analyzing the yaw-rate signal takes place when the linear acceleration is smaller than a first threshold value, in order to recognize the deviation of the yaw-rate signal.

19 Claims, 4 Drawing Sheets (51) Int. Cl.
  *B60W 50/02* (2012.01)
  *B60W 40/114* (2012.01)
  *G06F 17/00* (2019.01)
  *G01C 21/26* (2006.01)
(52) U.S. Cl.
  CPC .............. *B60W 2050/0215* (2013.01); *B60W 2520/125* (2013.01); *B60W 2520/14* (2013.01)
(58) Field of Classification Search
  USPC ............. 701/29.7, 31.1, 25, 31, 34; 73/1.37, 73/504.12; 364/426.02
  See application file for complete search history.

(56) References Cited

U.S. PATENT DOCUMENTS

| | | | |
|---|---|---|---|
| 6,347,541 B1* | 2/2002 | Maleki | 73/1.38 |
| 6,611,741 B2 | 8/2003 | Michi et al. | |
| 6,661,346 B1* | 12/2003 | Wood et al. | 340/601 |
| 2003/0109939 A1* | 6/2003 | Burgdorf | B60G 17/015 700/38 |
| 2003/0163226 A1 | 8/2003 | Tan | |
| 2004/0098184 A1* | 5/2004 | Ghoneim | B60T 8/17555 701/70 |
| 2004/0153228 A1* | 8/2004 | Matsumoto | B60T 8/17552 701/41 |
| 2007/0299580 A1* | 12/2007 | Lin et al. | 701/41 |
| 2008/0278334 A1* | 11/2008 | Kataoka et al. | 340/933 |
| 2009/0012735 A1 | 1/2009 | Reichmann | |
| 2010/0199763 A1* | 8/2010 | Zunft | 73/504.12 |
| 2011/0004359 A1 | 1/2011 | Kretschmann et al. | |
| 2011/0071727 A1* | 3/2011 | Bechtler et al. | 701/34 |
| 2011/0226036 A1 | 9/2011 | Jiang et al. | |
| 2012/0197477 A1* | 8/2012 | Colwell | 701/25 |

FOREIGN PATENT DOCUMENTS

| | | |
|---|---|---|
| CN | 101548249 | 9/2009 |
| DE | 199 64 020 | 7/2001 |
| DE | 103 48 165 | 5/2005 |
| DE | 10 2006 049 118 | 4/2008 |
| DE | 10 2007 004 606 | 7/2008 |

* cited by examiner

METHOD AND DEVICE FOR RECOGNIZING A DEVIATION OF A YAW-RATE SIGNAL OF A YAW-RATE SENSOR

FIELD OF THE INVENTION

The present invention relates to a method for recognizing a deviation of a yaw-rate signal of a yaw-rate sensor, to a corresponding control unit as well as to a corresponding computer program product.

BACKGROUND INFORMATION

The inertial sensors used for active and passive safety include a single-channel yaw-rate sensor and a two-channel acceleration sensor in one housing. Very high requirements are placed on the offset stability of the inertial sensors.

German Patent Application No. DE 20 3007 004 606 A1 deals with a method for ascertaining a signal offset of a yaw-rate sensor. For ascertaining the signal offset, a signal of the yaw-rate sensor is detected and integrated. The signal offset of the yaw-rate sensor is ascertained if the absolute value of the transverse acceleration is smaller than a threshold value.

SUMMARY

An example method for recognizing a deviation of a yaw-rate signal of a yaw-rate sensor, furthermore an example device which uses this method, as well as ultimately a corresponding computer program product are provided in accordance with the present invention. Advantageous embodiments result from the description below.

The present invention is based on the finding that an absolute yaw-rate offset error, caused by inadmissible drifts or errors in the sensor, may be ascertained automatically at rest by the sensor. No additional yaw-rate sensor is needed for the monitoring. Here, only that error is of interest which is beyond the scope of a specified, known error. Exceedances may thus be indicated to the system or made available as absolute variables. In this way, a relevant function, which is based on a signal of the sensor, may respond to the error by expanding the safety range for triggering the function, for example. During "normal operation," reliable operation must be ensured only in the presence of the pure specified, i.e., known error. The quality or performance of the function may thus be selected to be as high as possible, since, beyond the specified range, unknown errors are recognized in the offset.

With the aid of the example method according to the present invention, an automatic recognition of offset jumps and drifts of the yaw-rate signal is made possible, for example, in an inertial sensor having a yaw-rate sensor and an acceleration sensor. To determine the actual rest offset of the sensor, it should be ensured that no external physical forces acting on the vehicle generate an actual yaw rate in the sensor. This true yaw-rate actually generated might otherwise be interpreted as an erroneous yaw-rate from the stored data regarding the allowed value at rest. For this reason, the signals of the high-resolution acceleration sensors, which are also present in the inertial sensor, are used according to the present invention. The signals may also be made available by other suitable sensors, instead of by an inertial sensor.

The requirements which are placed on the offset stability of inertial sensors include, for example, that without the influence by external physical forces, i.e., at rest, the yaw-rate signal may only provide an output signal of 0°/s at the sensor output. Since every measuring system has errors, this signal is specified by a tolerance which covers the entire range of operation and the lifetime. Customers' requirements of today allow the yaw-rate signal a maximum deviation of ±3°/s from the actually measured measured value. With reference to the above-mentioned example of the position at rest, the yaw-rate signal provided at the sensor output may thus have a value between −3°/s and +3°/s, although the actual yaw rate at rest is 0°/s.

In applications such as ESP, active steering, or also airbag, the offset error of the inertial sensors is a main variable which determines the quality of the function. The vehicle function should therefore be robust enough to compensate for offset errors, i.e., deviations from the signal actually applied. Here, it must be taken into account that not only the allowed offset error of +3°/s in this case, but rather also greater deviations of the offset during operation are considered based on inadmissible drifts due to leaving the specified operation range or caused by errors, for example. This compensation is always a compromise between quality and robustness. This means that the known systematic error must be compensated for by the function by providing a safety margin to the function intervention point, i.e., the activation, or it causes the system to respond less precisely to the measuring signal, thus resulting in loss of quality.

Since there are also functions in the motor vehicle which require a very high quality of the measuring signals, e.g., the active steering, imprecision in the response of the function is no longer justifiable. According to the present invention, it is thus no longer necessary to install at least the double, i.e., redundant, amount of necessary sensors in order to determine the quality of the measuring signals by providing multiple identical measuring signals and by comparing them to one another. By not using identical sensors in one control unit multiple times, an increase in the development and production costs may be avoided.

In accordance with the present invention, a method is provided for recognizing a deviation of a yaw-rate signal of a sensor of a vehicle, including the following steps: receiving a piece of information regarding a linear acceleration of the vehicle via a first interface; receiving the yaw-rate signal via a second interface, the yaw-rate signal representing a yaw speed of the vehicle; and analyzing the yaw-rate signal when the linear acceleration is smaller than a first threshold value in order to recognize the deviation of the yaw-rate signal.

The vehicle may be a motor vehicle. The information regarding the linear acceleration and the yaw-rate signal may be provided by one or multiple sensors, for example, by acceleration sensors or by an inertial sensor. If the sensor(s) is/are situated in the vehicle, the linear acceleration and the yaw rate of the vehicle may be ascertained. The linear acceleration may represent a transverse acceleration or a longitudinal acceleration of the vehicle. The yaw rate may characterize a yaw speed of the vehicle, e.g., about a vehicle vertical axis, a vehicle longitudinal axis, or a vehicle transverse axis. The deviation of the yaw-rate signal may represent a measurement error of the yaw-rate signal, i.e., a difference between a yaw-rate value indicated by the yaw-rate signal and an actually present yaw-rate value. The deviation may result from an offset error of the sensor which may be caused by inadmissible drifts or sensor errors, for example. In particular, a deviation may be recognized which exceeds an admissible, known, or tolerable deviation of the yaw-rate signal. Depending on whether the method is implemented using a sensor or an evaluation device, the first and the second interfaces may be internal sensor interfaces or interfaces to one or more sensors. The information regarding the linear acceleration may include measured values corresponding to the chronological sequence of the linear acceleration. In this way, the information regarding a linear acceleration may provide a characteristics curve over time of the linear acceleration. Accordingly, the yaw-rate signal may include measured values corresponding to the chronological sequence of the yaw rate. In this way, the yaw-rate signal may provide a characteristics curve over time of the yaw rate. The yaw-rate signal may be analyzed when the absolute value of the linear acceleration is smaller than that of the first threshold value. The information regarding the linear acceleration may have a an error at rest. The error at rest may result in an indicated value for a linear acceleration, although the sensor is at rest, when there is actually no linear acceleration. The first threshold value may define an allowed tolerance limit for the error at rest. Analyzing the yaw-rate signal may include evaluating consecutive values of the yaw-rate signal. For this purpose, the consecutive values of the yaw-rate signal may be combined and subsequently compared to a suitable threshold value. Depending on the specific embodiment, reaching, exceeding or falling below the threshold value may indicate a deviation of the yaw-rate signal. As soon as the deviation of the yaw-rate signal is recognized, a corresponding piece of information may be provided. The information may contain an indication regarding the fact that a deviation is present. Additionally, the information may indicate an extent of the deviation. The extent of the deviation may characterize an instantaneous sensor error which may be taken into account when the sensor data is further processed. Alternatively, a further processing of the sensor data may be prevented when the recognized deviation is too great.

The method according to the present invention may include a step of comparing the information regarding the linear acceleration to the first threshold value. With the aid of the comparison, it may be determined whether the linear acceleration is smaller than the first threshold value. For this purpose, an absolute value of the linear acceleration may be compared to the first threshold value. Alternatively, different first threshold values, which may or may not have different absolute values, may be provided for different signs of the linear acceleration. Also, a processed value of the linear acceleration may be compared to the first threshold value. A corresponding processing may include intensifying or filtering the measured linear acceleration. Here, an absolute value of the linear acceleration and not only a change in the linear acceleration, as would, for example, be the case for a derivative of a characteristics curve over time of the linear acceleration, may still be derived from the processed value. If the result of the comparison yields that the linear acceleration is smaller than the first threshold value, it may be assumed that either no or only a negligibly small linear acceleration and thus no or only a negligibly small yaw rate is present. In this case, the analysis of the yaw-rate signal may be started or continued. For the case that it is established based on the comparison that a non-negligible linear acceleration is present, the analysis of the yaw-rate signal may be terminated or not started in the first place.

The step of analyzing may include summing up the yaw-rate signal over a time period. By summing up, a yaw-rate sum signal may be obtained. The deviation of the yaw-rate signal may be recognized by comparing the yaw-rate sum signal to a second threshold value. When summing up, chronological sign-bearing discrete values of the yaw rate may be added up. The yaw-rate signal may also be integrated over time during the summing up. The yaw-rate sum signal may thus correspond to a rotation angle which is actually present within the time period or is simulated due to the deviation of the yaw-rate signal. If the linear acceleration is smaller than the first threshold value, it may be assumed that no rotation is present and that the yaw-rate sum signal thus results from the deviation of the yaw-rate signal. The time period may be fixedly predefined. The deviation may be regarded as recognized when the yaw-rate sum signal reaches the second threshold value or exceeds it within the time period or at the end of the time period.

According to one specific embodiment, the deviation of the yaw-rate signal may be recognized when the yaw-rate sum signal exceeds the second threshold value within the time period. The time period may be shorter than 200 ms. For example, the time period may range between 20 ms and 40 ms. After a first time period has elapsed, the yaw-rate signal may be analyzed again. For this purpose, the yaw-rate sum signal may be reset and the summing up of the yaw-rate signal may be started anew.

The first threshold value may be smaller or equal to a limiting value of an admissible noise component of the information regarding the linear acceleration. In this way, it may be determined in a simple manner whether there is an actual linear acceleration which would prevent the deviation of the yaw-rate signal from being recognized.

Accordingly, the second threshold value may correspond to a value which results from summing up an admissible deviation of threshold value may correspond to a value of the admissible deviation of the yaw-rate signal summed up over the time period. Also, the second threshold value may correspond to a value which is slightly greater than the value which results from summing up the admissible deviation of the yaw-rate signal over the time period. The admissible deviation may correspond to a known specified error of the yaw-rate signal. If the summing up of the yaw-rate signal results in the second threshold value being reached or exceeded, although it is determined via the linear acceleration that there is no actual yaw rate, this means that the deviation of the yaw-rate signal is greater than the admissible deviation.

According to one specific example embodiment, the method according to the present invention may include a step of providing a value of the yaw-rate sum signal by the end of the time period. The yaw-rate sum signal may be provided to an evaluation device or a storage device for a new analysis of the yaw rate prior to resetting the yaw-rate sum signal. The yaw-rate sum signal indicates an instantaneously present deviation of the yaw-rate signal and may be taken into account when the yaw-rate signal is further processed. For example, a correction value may be used from the yaw-rate sum signal for correcting a yaw-rate signal which is provided for further processing.

The linear acceleration may represent a transverse acceleration or a longitudinal acceleration of the vehicle, and the yaw rate may represent a yaw speed of the vehicle about a vehicle vertical axis, a vehicle longitudinal axis, or a vehicle transverse axis. Thus, the example method according to the present invention may be advantageously used for securing the yaw rate and/or the roll rate and/or the pitch rate.

Furthermore, the present invention provides an example device which is designed to carry out or implement the steps of the example method according to the present invention in appropriate devices. This embodiment variant of the present invention in the form of a device also makes it possible to achieve the object underlying the present invention rapidly and efficiently. The device may be a sensor, an evaluation device, or a control unit.

In the present case, a device may be understood as an electrical device which processes sensor signals and outputs control signals as a function thereof. The device may have an interface which may be designed as hard- and/or software. In the case of a hardware design, the interfaces may, for example, be a part of a so-called ASICs system, which includes various functions of the device. It is, however, also possible that the interfaces are independent, integrated circuits or are at least partially made of discrete components. In the case of a software design, the interfaces may be software modules which are present on a microcontroller next to other software modules, for example.

A computer program product having program code is also advantageous, which is stored on a machine-readable carrier, such as a semiconductor memory, a hard disk memory, or an optical memory, and is used for carrying out the example method according to one of the specific embodiments described above, when the program is executed on a control unit.

BRIEF DESCRIPTION OF THE DRAWINGS

The present invention is explained in greater detail below on the basis of the figures as an example.

DETAILED DESCRIPTION OF EXAMPLE EMBODIMENTS

In the description below of preferred exemplary embodiments of the present invention, the elements which are illustrated in the various figures and appear to be similar are identified with identical or similar reference numerals; a repetitive description of these elements is dispensed with.

Figure 1:
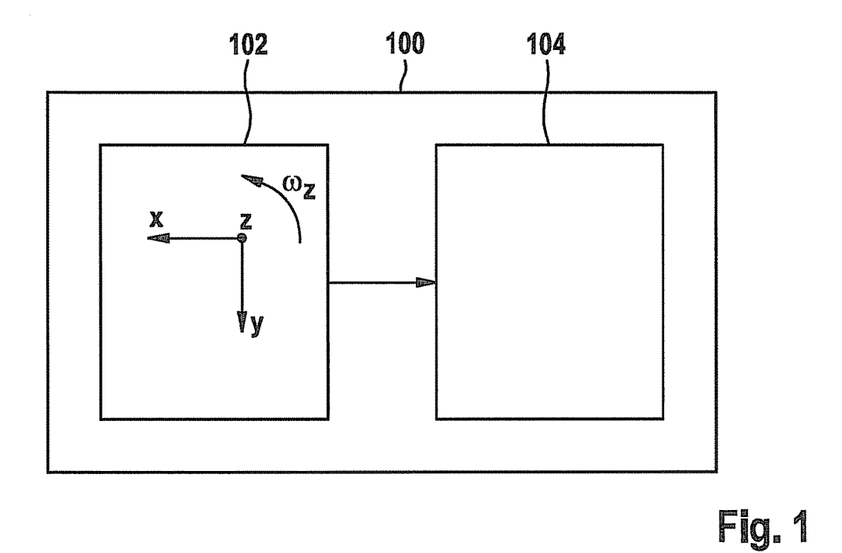
FIG. 1 shows a schematic representation of a vehicle.

FIG. 1 shows a schematic representation of a vehicle in which an example method according to the present invention for recognizing a deviation of a yaw-rate signal of a sensor may be implemented according to one exemplary embodiment of the present invention.

A vehicle 100, in which an inertial sensor 102 is situated, is shown. Inertial sensor 102 is designed to detect the linear accelerations of the vehicle in vehicle longitudinal axis x and vehicle transverse axis y and a yaw rate $\omega_z$ of the vehicle about vehicle vertical axis z and to provide the corresponding information or signals to an evaluation device 104. Evaluation device 104 may be a part of inertial sensor 102 or may be designed as a separate device which is connected to inertial sensor 102 via a corresponding interface.

Figure 2:
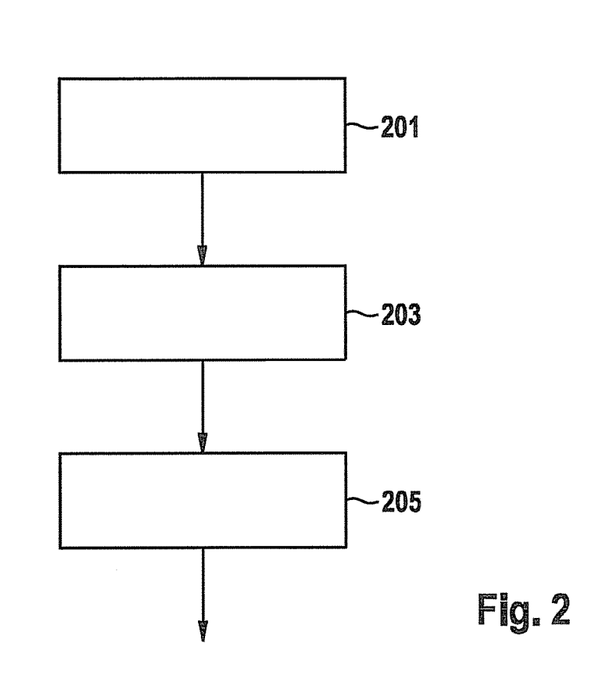
FIG. 2 shows a flow chart of an example method according to the present invention.

FIG. 2 shows a flow chart of a method for recognizing a deviation of a yaw-rate signal of a sensor according to one exemplary embodiment of the present invention. In a step 201, a piece of information regarding a linear acceleration is received. The information regarding the acceleration may be a transverse acceleration along the vehicle transverse axis.

Figure 3:
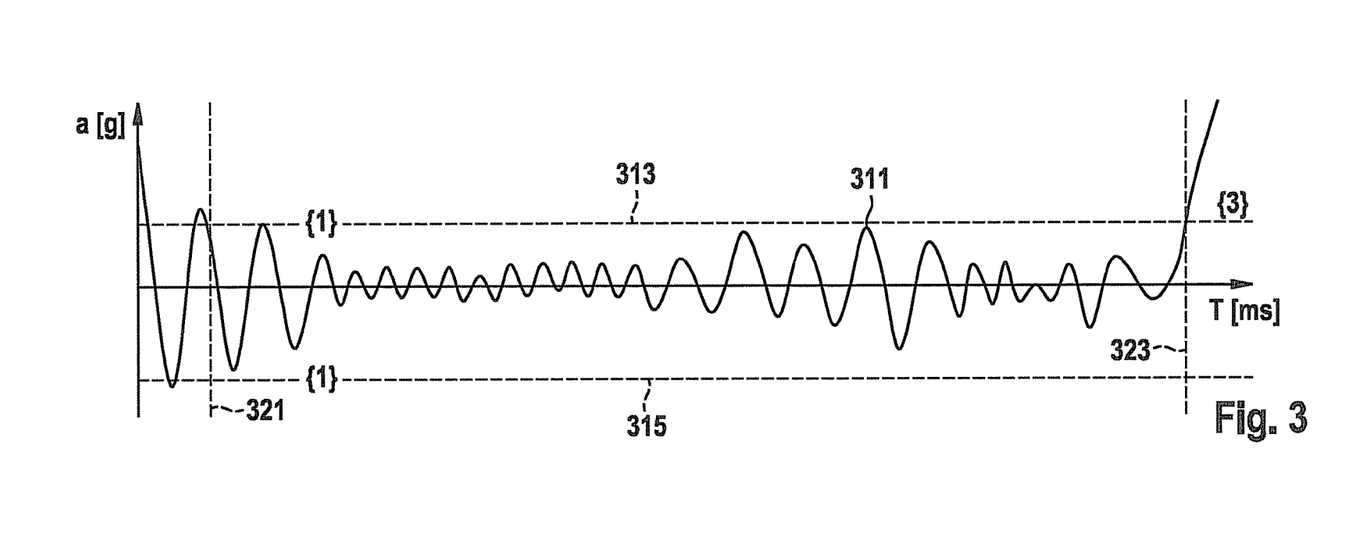
FIG. 3 shows a representation of an acceleration signal.
Figure 4:
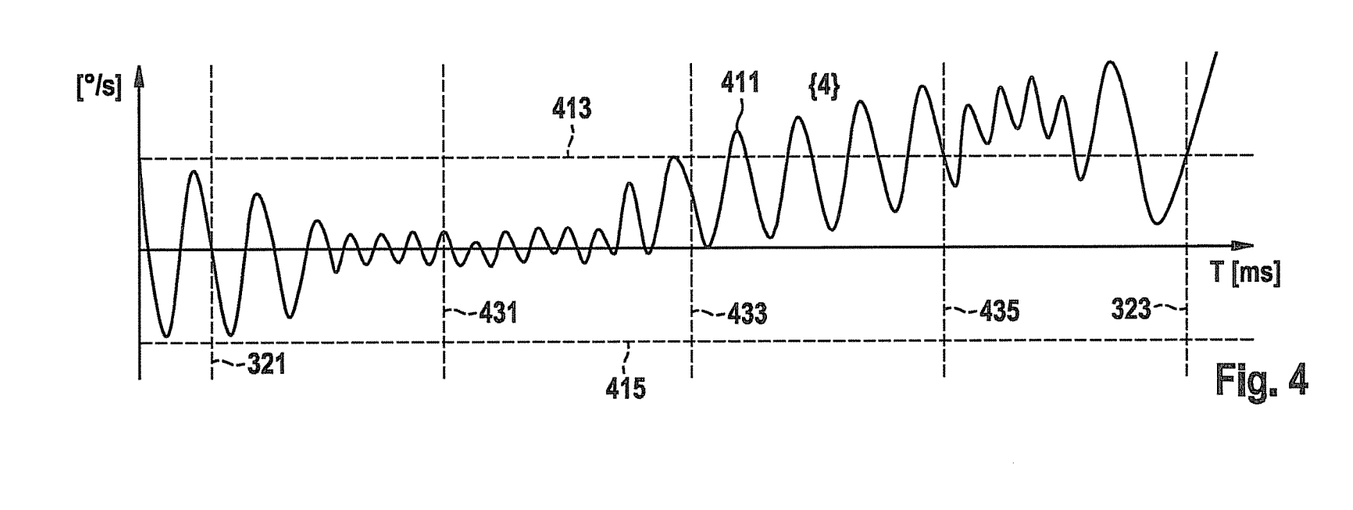
FIG. 4 shows a representation of a yaw-rate signal.

The information regarding the acceleration may represent an acceleration signal, as shown in FIG. 3. In a step 203, the yaw-rate signal is received. The yaw-rate signal may be the yaw rate of the vehicle about the vehicle vertical axis. The yaw-rate signal may have a characteristics curve, as is shown in FIG. 4. Steps 201, 203 may also be carried out in reverse sequence or simultaneously. In particular, the information regarding the linear acceleration and the yaw-rate signal may be received continuously. In a step 205, the yaw-rate signal is analyzed. The analysis may be carried out in parallel to steps 201, 203 when the linear acceleration is smaller than a threshold value. The deviation of the yaw-rate signal may be recognized with the aid of the analysis. The analysis may be carried out according to the procedure described based on FIG. 5.

Figure 5:
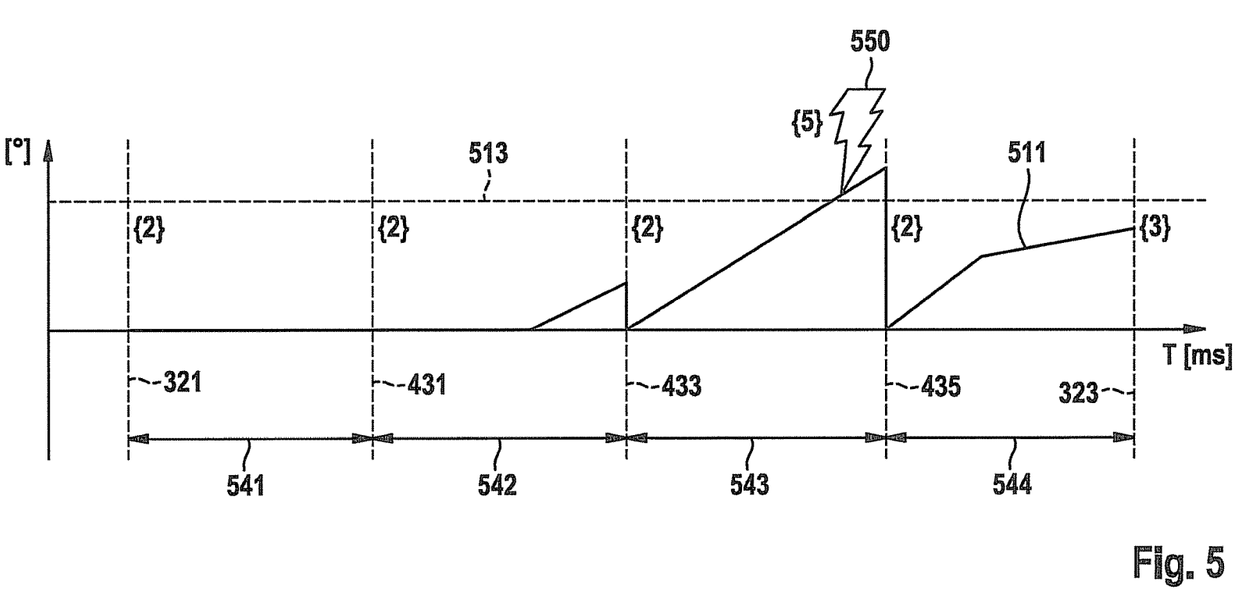
FIG. 5 shows a representation of an analysis of the yaw-rate signal.

Based on FIGS. 3 through 5, the method according to the present invention is described according to one exemplary embodiment which is based on a principle of continuous determination of the absolute yaw-rate offset at rest.

FIG. 3 shows a characteristics curve over time of a linear acceleration 311 in a coordinate system in which time T in milliseconds is plotted on the abscissa, and acceleration a[g] is plotted on the ordinate. The linear acceleration may be a y acceleration, i.e., a transverse acceleration of a vehicle, for example. Even if in reality there is no linear acceleration, the characteristics curve of linear acceleration 311 may have an amplitude due to noise. In FIG. 3, an upper noise threshold 313 and a lower noise threshold 315 are shown with regard to the linear acceleration. Upper noise threshold 313 and lower noise threshold 315 have different signs and may have the same absolute value. Noise thresholds 313, 315 define the acceleration values which delimit a range to which a negligible actual transverse acceleration corresponds.

In a time range until a starting point in time 321, the characteristics curve of linear acceleration 311 has strong oscillations having an amplitude which exceeds noise thresholds 313, 315. Starting from starting point in time 321 and until stopping point in time 323, the characteristics curve of linear acceleration 311 has oscillations which occur within the range delimited by noise thresholds 313, 315. The oscillations between points in time 321, 323 may be caused by noise. This means that the characteristics curve of linear acceleration 311 shows a linear acceleration, although in reality there is no linear acceleration. At stopping point in time 323, the characteristics curve of linear acceleration 311 exceeds upper noise threshold value 313. This may be caused by an actually present linear acceleration.

FIG. 4 shows a characteristics curve over time of a yaw rate 411 in a coordinate system in which time T in milliseconds is plotted on the abscissa, and yaw rate [°/s] is plotted on the ordinate. The yaw rate may be a yaw speed of a vehicle. Even if in reality there is no yaw rate, the characteristics curve of yaw rate 411 may have an amplitude due to noise. In FIG. 4, an upper offset and noise threshold 413 and a lower offset and noise threshold 415 are shown with regard to the yaw rate. A noise plus an allowed raw offset of the yaw-rate sensor is permitted. Upper offset and noise threshold 413 and lower offset and noise threshold 415 have different signs and may have the same absolute value.

Between starting point in time 321 and stopping point in time 323, which correspond to the corresponding points in time from FIG. 3, three other points in time 431, 433, 435 are plotted. In a time range prior to starting point in time 321 and until point in time 433, the characteristics curve of yaw rate 411 has oscillations which occur within the range delimited by offset and noise thresholds 413, 415. Starting from point in time 433, the characteristics curve of yaw rate 411 has oscillations having an amplitude which exceeds upper offset and noise thresholds 413.

FIG. 5 shows a characteristics curve over time of a window integral yaw rate in the form of a rotation angle 511 in a coordinate system in which time T in milliseconds is plotted on the abscissa, and rotation angle [°] is plotted on the ordinate. The rotation angle is ascertained by integrating the characteristics curve of the yaw rate over time shown in FIG. 4, rotation angle 511 being reset on a regular basis. Instead of the integration, a summing up of the discrete values of the yaw rate may also be carried out. Even if in reality there is no yaw rate, the characteristics curve of the yaw rate may have an amplitude due to noise. Thus, the characteristics curve of rotation angle 511 may indicate rotation angle values even if there is no yaw rate in reality. In FIG. 5, an upper offset threshold 513 is shown with regard to the rotation angle.

It is apparent from FIG. 5 that points in time 431, 433, 435, which correspond to those in FIG. 4, between starting point in time 321 and stopping point in time 323, are selected in such a way that time windows 541, 542, 543, 544 for the integration of the yaw rate are formed between adjoining points in time 321, 431, 433, 435, 323. Time windows 541, 542, 543, 544 may each have the same duration.

Analysis of the yaw rate does not take place prior to starting point in time 321. The analysis starts at starting point in time 321. Accordingly, the integration of the yaw rate starts at starting point in time 321. Within first time window 541, the yaw rate has an oscillation characteristics curve which is symmetrical around the zero point. Accordingly, the characteristics curve of rotation angle 511 has no slope within first time window 541. At the end of first time window 541, at point in time 431, the value of rotation angle 511 is reset again. Within the second half of second time window 542, the yaw rate has an oscillation characteristics curve which is offset with regard to the zero point. Accordingly, the characteristics curve of rotation angle 511 has a slope within second time window 542. After the yaw rate remains within the offset and noise thresholds in second time window 542, the characteristics curve of rotation angle 511 does not exceed offset threshold 513 within second time window 542. At the end of second time window 542, at point in time 433, the value of rotation angle 511 is reset again.

Within third time window 543, the yaw rate has an oscillation characteristics curve which is offset with regard to the zero point. Accordingly, the characteristics curve of rotation angle 511 has a slope within third time window 543. After the yaw rate exceeds at least temporarily the upper offset and noise thresholds in third time window 543, the characteristics curve of rotation angle 511 exceeds offset threshold 513 within third time window 543. This results in an offset error recognition 550. Thus, a deviation of the yaw-rate signal lying above the predefined tolerance has been recognized. At the end of third time window 543, at point in time 435, the value of rotation angle 511 is reset again.

Within fourth time window 544, the yaw rate still has an oscillation characteristics curve which is offset with regard to the zero point. Accordingly, the characteristics curve of rotation angle 511 has a slope within fourth time window 544. The integration ends at stopping point in time 323 which is characterized in that the acceleration shown in FIG. 3 exceeds the upper noise threshold.

The example method according to the present invention is described again in the following with reference to FIGS. 3 through 5 based on the exemplary embodiment of a vehicle.

During every curve negotiation, a lateral acceleration force, centrifugal force $F_z$, occurs in the vehicle. The centrifugal force is composed of the mass of the vehicle, the velocity, and the radius of the curve. As long as this force $F_z$ is smaller than static friction force $F_R$ of the vehicle, the vehicle will move safely through the curve. The static friction force results from the weight force of the vehicle and static friction coefficient µ which depends on the two friction partners wheel-road.

In the least favorable case of a completely iced up roadway, µ is approximately 0.1. In this way, the lateral acceleration to be expected may be deduced from the force equilibrium, without leaving the desired lane (normal drive). This lateral acceleration ay lies in the range of 0.981 m/s².

Based on an inertial sensor for simultaneously measuring yaw rate $\omega_z$, which describes a rotation about the vehicle vertical axis, as well as accelerations ax and ay of the vehicle longitudinal axis and the vehicle transverse axis, the absolute yaw rate offset error of the yaw rate may be ascertained. For this purpose, the variable of acceleration signal ay 311 of the vehicle transverse axis is continuously monitored, as shown in FIG. 3. This is necessary, since accelerations of the vehicle transverse axis represent the essential variable for the possible occurrence of rotations about the vehicle vertical axis or only indicate a curve negotiation, which also lead to small yaw rates about the vertical axis.

As long as acceleration signal ay of the vehicle transverse axis is in a defined range, which corresponds to the signal value at rest without external lateral acceleration including the allowed noise, as is characterized by {1} in FIG. 3, yaw-rate signal 411 of the yaw-rate sensor, which is shown in FIG. 4, may be monitored for offset errors. Here, for the duration of lateral acceleration ay not being above the noise, every data item of the yaw-rate sensor is integrated into the rotation angle for a fixed time interval t_Integral, as is characterized by {2} in FIG. 5.

This time window t_Integral 541, 542, 543, 544, shown in FIG. 5, is established for 20 ms but could be arbitrarily extended. The minimum requirement of 20 ms results from the desired error recognition time which may correspond to a clients' requirement. Every new provided yaw-rate date is integrated within this time. The integration eliminates the noise and other accidentally occurring signals of the yaw-rate sensor. In this way, the rotation angle results from adding the yaw rate per signal date over time t_Integral, here 20 ms.

$$\text{Rotation Angle} = \int_{t=0ms}^{t=20ms} \omega_z dt$$

Prerequisite: ay≤max. admissible noise ay sensor

For example, a transverse acceleration ay, which is smaller than or equal to a specified noise of transverse acceleration ay including a possible safety reserve, means rest. This means that there are no external influences. This is comparable to driving straight ahead. Every signal date $\omega_2$ having 3°/s max, which are allowed per 1 ms sampling time, is integrated to 20 ms. This results in a rotation angle of 0.06°.

As long as the vehicle is operated without measurable lateral acceleration ay, while stopping at a traffic light or driving straight ahead, for example, measured lateral acceleration ay will correspond only to the known noise and the allowed offset drift of the transverse acceleration sensor. In today's inertial sensors, this value lies in the range of approximately 0.1 m/s². This response threshold, shown in FIG. 3, may, however, be selected freely to take into account system-specific adaptations to the target applications. Generally, the threshold will, however, derive from the known noise of the lateral acceleration sensor including offset, while considering its maximum values, the so-called peak-to-peak values.

The response threshold is responsible for the start of the offset drift measurement, i.e., the integration of the yaw rate of the yaw-rate sensor. At the same time, however, the increase in the transverse acceleration beyond this response threshold means discontinuation of the offset drift measurement, since it must now be assumed that external physical forces may generate a real yaw rate in the yaw-rate sensor, as is illustrated by {3} in FIGS. 3 and 5.

If the allowed drift of the yaw-rate signal of ±3°/s max. is taken into account, an admissible rotation angle of ±0.06° over 20 ms integration results from the example above. As long as the rotation angle below 0.06° remains absolute, depending on the length, i.e., the duration, the integration, and the allowed offset of the sensor, there is no inadmissible offset drift. Drifts above ±3°/s, as illustrated by {4} in FIG. 4, are, however, recognized via the integration and result in a greater absolute rotation angle than 0.06°. This exceedance is used as a condition to indicate to the system the inadmissible deviation of the yaw-rate offset, as is shown by {5} in FIG. 5.

For this purpose, it is possible to couple the information to a monitoring signal which is continuously integrated during the transmission of the instantaneous sensor signals to the evaluation system, e.g., a microcontroller. In this way, it is still possible to indicate the "status" of the sensor during the continuous transmission to the evaluation system. For example, a digital acceleration sensor is able to use its SPI interface to digitally indicate additional information in addition to the measured value.

Figure 6:
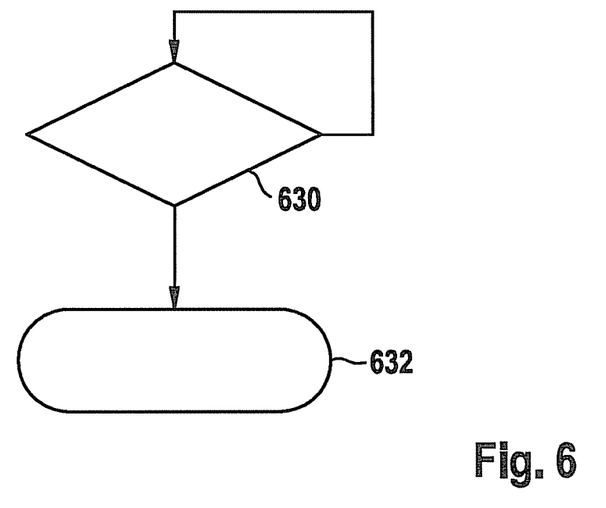
FIG. 6 shows a flow chart of an exemplary embodiment of the present invention.

FIG. 6 shows a flow chart of an exemplary embodiment of the present invention. This exemplary embodiment is based on a principle of storing the integrated rotation angle during phases of rest, i.e., during which no lateral acceleration occurs.

In a step 630, it is checked whether the rotation angle has finished integrating over the time window, here over 20 ms. With reference to FIG. 5, rotation angle 511 has, for example, finished integrating at points in time 431, 433, 435, 323. If it is determined in step 630 that the rotation angle has not finished integrating, step 630 is repeated. If, however, it is determined in step 630 that the rotation angle has finished integrating, the rotation angle is stored in a step 632, in a variable x, for example. This means that the rotation angle ascertained during the most recently performed integration is stored. Moreover, a new integration is started. Over the course of the new integration, it is again continuously checked in step 630 whether the new rotation angle has finished integrating.

Steps 630, 632 may, in turn, be carried out as long as ay<ay_allowed applies. Here, ay identifies the acceleration in the transverse direction indicated by the sensor, and ay_allowed identifies the response threshold, as they are shown in FIG. 3.

Figure 7:
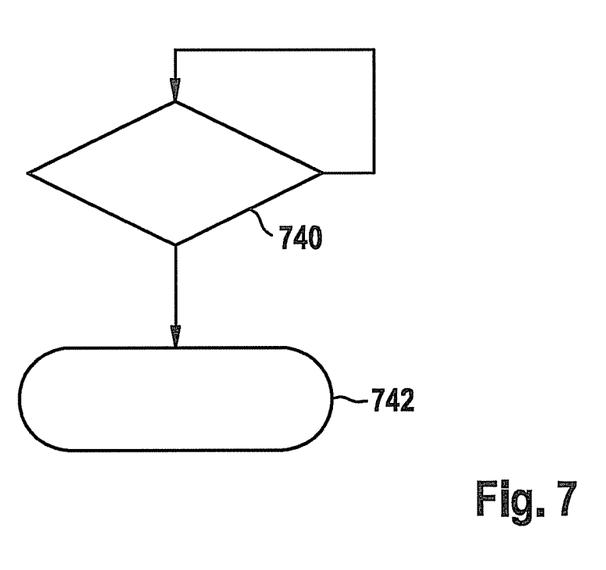
FIG. 7 shows a flow chart of another exemplary embodiment of the present invention.

FIG. 7 shows a flow chart of an exemplary embodiment of the present invention. This exemplary embodiment is based on a principle of providing a piece of information when the threshold for the allowed rotation angle is exceeded.

In a step 740, it is checked whether rotation angle x is above the allowed rotation angle. Rotation angle x may be the rotation angle which is stored in step 632 in the exemplary embodiment shown in FIG. 6. This makes it possible to compare the rotation angle to a threshold value after the time window of the integration has elapsed. Alternatively, the rotation angle may also be rotation angle 511 shown in FIG. 5 which may be continuously compared to the threshold value while the integration is carried out. If it is determined in step 740 that the rotation angle does not exceed the allowed rotation angle, step 740 is repeated. If, however, it is determined in step 740 that the rotation angle exceeds the allowed rotation angle, a piece of information regarding a setting of a status notification occurs in a step 742. The status notification may indicate that the rotation angle exceeds the allowed rotation angle, and thus a deviation of the yaw-rate signal is present which is above the tolerable or known deviation.

Step 740 may be continuously repeated so that variable x is continuously monitored.

As described with reference to FIGS. 6 and 7, the measurement of the yaw-rate offset described with reference to FIGS. 3 through 5 may be carried out continuously by the sensor or else by the subsequent evaluation unit, as long as only the transverse acceleration of the vehicle, measured via the integrated high-resolution lateral acceleration sensor, lies below the triggering threshold of ±0.1 m/s², for example. As soon as the first result of the integration is available, the calculated rotation angle is stored. The subsequent results from the continuous measurements, here every 20 ms, are also continuously stored by overwriting the rotation angle previously calculated. It is thus possible to read out the instantaneous rotation angle from the sensor at any time or else to not read it out until the exceedance has been indicated, i.e., in an event-controlled manner, as is shown in FIG. 7.

The evaluation unit is able to calculate the transmitted rotation angle back to the absolute yaw-rate offset at rest at any time through knowledge of integration time t_Integral. This takes place by simple differentiation of the rotation angle over time t_Integral.

Due to the measuring principle, the monitoring according to the present invention may also be used for a roll rate sensor. These inertial sensors also have a highly sensitive lateral ay and a vertical az acceleration element. In the case of vehicle rotations about the longitudinal axis, rolling corresponds here to a rollover, vertical and lateral accelerations also always occur. The monitoring of both accelerations for exceedances of the allowed noise may be used for discontinuing the offset drift measurement of the roll rate signal.

In principle, the method according to the present invention may thus be used in all inertial sensors, i.e., sensors which have at least one yaw-rate channel and one acceleration channel in the direction of action to the axis of rotation in a housing, e.g., a $\omega_z$ yaw-rate element and an ay acceleration element. The internal acceleration channel must be sensitive enough to recognize, over its own noise, the accelerations which lead to yaw rates in the yaw-rate sensor. All ESP central acceleration sensors are typically identified by "low g x,y." The measuring range mostly lies in the range up to ±50 m/s², the resolution being at least 0.002 m/s². External acceleration sensors may also be used. This means that inertial sensors are not necessarily required for the use according to the present invention.

The signal processing and the offset ascertainment does not necessarily have to be located in the same sensor housing, i.e., on an ASIC, for example, and could be carried out by an external arithmetic unit. Analog sensors, in which the measuring signal is transmitted analogously to an external microcontroller, where it is further processed, are typical for this purpose.

The approach according to the present invention may be used in inertial sensors. Such sensors may have an integrated microcontroller which may be used for monitoring the sensor signals. The advantage of such a microcontroller is due to flexible programming; it is possible to revert directly to the measured data of the sensor in the sensor itself. The implementation of the offset drift monitoring according to the present invention may thus take place via software programming and does not have to be taken into account in the ASIC design, thus resulting in a reduction of costs. Moreover, the parameterization may be performed in a flexible manner during the development of the individual prototype phases.

The exemplary embodiments described and shown in the figures have only been selected as examples. Different exemplary embodiments may be combined with each other in their entirety or with regard to their individual features. Also, one exemplary embodiment may be supplemented with features of another exemplary embodiment. Furthermore, method steps according to the present invention may be repeated and executed in a sequence different from the one described.

What is claimed is:

1. A method for detecting a deviation of a yaw-rate signal of an inertial sensor module comprising a yaw-rate sensor and a sensor providing a linear acceleration signal of a vehicle, the method comprising:
receiving information regarding a linear acceleration of the vehicle by receiving the linear acceleration signal via a first integrated circuit;
receiving the yaw-rate signal from the yaw-rate sensor via a second integrated circuit, the yaw-rate signal representing a yaw rate of the vehicle;
analyzing the yaw-rate signal when the linear acceleration is detected to fall below a first threshold value;
detecting a deviation of the yaw-rate signal as a result of the analyzing of the yaw-rate signal; and
controlling an airbag system in accordance with the recognized deviation, wherein the analyzing includes summing up the yaw-rate signal over a time period in order to obtain a yaw-rate sum signal, and the deviation of the yaw-rate signal is recognized by comparing the yaw-rate sum signal to a second threshold value.

2. The method as recited in claim 1, further comprising:
comparing the information regarding the linear acceleration to the first threshold value to determine whether the linear acceleration is smaller than the first threshold value.

3. The method as recited in claim 1, wherein the deviation of the yaw-rate signal is detected when the yaw-rate sum signal exceeds the second threshold value within the time period.

4. The method as recited in claim 1, wherein the first threshold value is smaller or equal to a limiting value of an admissible noise component of the information regarding the linear acceleration.

5. The method as recited in claim 4, wherein the second threshold value corresponds to a value which results from summing up an admissible deviation of the yaw-rate signal over the time period.

6. The method as recited in claim 1, further comprising:
providing a value of the yaw-rate sum signal by the end of the time period.

7. The method as recited in claim 1, wherein the linear acceleration represents a transverse acceleration of the vehicle, and the yaw rate represents a yaw speed of the vehicle about one of a vehicle vertical axis or a vehicle longitudinal axis.

8. The method as recited in claim 1, wherein the linear acceleration value is instantaneous.

9. The method as recited in claim 1, wherein the sensor providing the linear acceleration is an acceleration sensor.

10. The method as recited in claim 1, wherein the analyzing includes:
identifying a period of time between a first time when the linear acceleration falls below the first threshold and a second time, subsequent to the first time, when the linear acceleration rises above the first threshold, the linear acceleration remaining below the first threshold for an entirety of the period of time;
dividing the period of time into a plurality of windows;
during each of the plurality of windows, performing a respective summing of the yaw-rate signal to produce a respective yaw rate sum signal, the yaw rate sum signal being reset at a conclusion of each of the plurality of windows; and
during each of the plurality of windows, comparing the yaw rate sum signal to the second threshold.

11. A device to detect a deviation of a yaw-rate signal of an inertial sensor module comprising a yaw-rate sensor and a sensor providing a linear acceleration signal of a vehicle, the device configured to:
receive information regarding a linear acceleration of the vehicle by receiving the linear acceleration signal via a first integrated circuit, receive the yaw-rate signal from the yaw-rate sensor via a second integrated circuit, the yaw-rate signal representing a yaw rate of the vehicle, analyze the yaw-rate signal when the linear acceleration is detected to fall below a first threshold value, detect a deviation of the yaw-rate signal as result of the analyzing of the yaw-rate signal, and
control an airbag system in accordance with the detected deviation, wherein the analyzing includes summing up the yaw-rate signal over a time period in order to obtain a yaw-rate sum signal, and the deviation of the yaw-rate signal is detected by comparing the yaw-rate sum signal to a second threshold value.

12. The device as recited in claim 11, wherein the sensor providing the linear acceleration is an acceleration sensor.

13. The device as recited in claim 11, wherein the device analyzes the yaw rate signal by:
identifying a period of time between a first time when the linear acceleration falls below the first threshold and a second time, subsequent to the first time, when the linear acceleration rises above the first threshold, the linear acceleration remaining below the first threshold for an entirety of the period of time;
dividing the period of time into a plurality of windows;
during each of the plurality of windows, performing a respective summing of the yaw-rate signal to produce a respective yaw rate sum signal, the yaw rate sum signal being reset at a conclusion of each of the plurality of windows; and
during each of the plurality of windows, comparing the yaw rate sum signal to the second threshold.

14. A non-transitory machine-readable medium storing program code, the program code to detect a deviation of a yaw-rate signal of an inertial sensor module comprising a yaw-rate sensor and a linear acceleration sensor providing a linear acceleration signal of a vehicle, the program code, when executed on a processor, causing the processor to perform the steps of:

receiving information regarding a linear acceleration of the vehicle by receiving the linear acceleration signal via a first integrated circuit, receiving the yaw-rate signal from the yaw-rate sensor via a second integrated circuit, the yaw-rate signal representing a yaw rate of the vehicle, analyzing the yaw-rate signal when the linear acceleration is detected to fall below a first threshold value, detecting a deviation of the yaw-rate signal as result of the analyzing of the yaw-rate signal, and controlling an airbag system in accordance with the detected deviation, wherein the analyzing includes summing up the yaw-rate signal over a time period in order to obtain a yaw-rate sum signal, and the deviation of the yaw-rate signal is detected by comparing the yaw-rate sum signal to a second threshold value.

15. The non-transitory machine-readable medium as recited in claim 14, wherein the sensor providing the linear acceleration is an acceleration sensor.

16. The non-transitory machine-readable medium as recited in claim 14, wherein the analyzing includes:

identifying a period of time between a first time when the linear acceleration falls below the first threshold and a second time, subsequent to the first time, when the linear acceleration rises above the first threshold, the linear acceleration remaining below the first threshold for an entirety of the period of time;

dividing the period of time into a plurality of windows;

during each of the plurality of windows, performing a respective summing of the yaw-rate signal to produce a respective yaw rate sum signal, the yaw rate sum signal being reset at a conclusion of each of the plurality of windows; and during each of the plurality of windows, comparing the yaw rate sum signal to the second threshold.

17. A method for detecting a deviation of a yaw-rate signal of an inertial sensor module comprising a yaw-rate sensor and a sensor providing a linear acceleration signal, of a vehicle, the method comprising:

receiving information regarding a linear acceleration of the vehicle by receiving the linear acceleration signal via a first integrated circuit;

receiving the yaw-rate signal from the yaw-rate sensor via a second integrated circuit, the yaw-rate signal representing a yaw rate of the vehicle;

analyzing the yaw-rate signal when the linear acceleration is detected to fall below a first threshold value;

detecting a deviation of the yaw-rate signal as a result of the analyzing of the yaw-rate signal;

correcting the yaw-rate signal based on the deviation;

and controlling an airbag system of the vehicle in accordance with the corrected yaw-rate signal, wherein the analyzing includes summing up the yaw-rate signal over a time period in order to obtain a yaw-rate sum signal, and the deviation of the yaw-rate signal is detected by comparing the yaw-rate sum signal to a second threshold value.

18. The method as recited in claim 17, wherein the sensor providing the linear acceleration is an acceleration sensor.

19. The method as recited in claim 17, wherein the analyzing includes:

identifying a period of time between a first time when the linear acceleration falls below the first threshold and a second time, subsequent to the first time, when the linear acceleration rises above the first threshold, the linear acceleration remaining below the first threshold for an entirety of the period of time;

dividing the period of time into a plurality of windows;

during each of the plurality of windows, performing a respective summing of the yaw-rate signal to produce a respective yaw rate sum signal, the yaw rate sum signal being reset at a conclusion of each of the plurality of windows; and during each of the plurality of windows, comparing the yaw rate sum signal to the second threshold.

\* \* \* \* \*